(12) United States Patent
Balamucki et al.

(10) Patent No.: US 6,973,854 B2
(45) Date of Patent: Dec. 13, 2005

(54) RANGE AND SPLITTER SYSTEM

(75) Inventors: Thomas M. Balamucki, Laurinburg, NC (US); Landon Ball, Laurinburg, NC (US)

(73) Assignee: ZF Meritor, LLC., Maxton, NC (US)

( * ) Notice: Subject to any disclaimer, the term of this patent is extended or adjusted under 35 U.S.C. 154(b) by 0 days.

(21) Appl. No.: 10/646,238

(22) Filed: Aug. 22, 2003

(65) Prior Publication Data

US 2005/0039573 A1 Feb. 24, 2005

(51) Int. Cl.[7] ............................................. F16H 3/02
(52) U.S. Cl. ................................. 74/745; 74/335
(58) Field of Search .......................... 74/335, 336 R, 74/745; 477/70

(56) References Cited

U.S. PATENT DOCUMENTS

| | | | | |
|---|---|---|---|---|
| 3,793,898 A | * | 2/1974 | Espenschied et al. | 74/335 |
| 4,555,959 A | * | 12/1985 | Braun | 74/334 |
| 4,748,863 A | * | 6/1988 | McNinch, Jr. | 74/335 |
| 5,044,216 A | * | 9/1991 | Steeby et al. | 74/335 |
| 5,528,949 A | * | 6/1996 | Stainton et al. | 74/335 |
| 5,560,248 A | * | 10/1996 | Devaud et al. | 74/335 |
| 5,957,028 A | * | 9/1999 | Tischer et al. | 92/5 R |

FOREIGN PATENT DOCUMENTS

EP 552557 * 7/1993

* cited by examiner

*Primary Examiner*—Ha Ho
(74) *Attorney, Agent, or Firm*—Carlson, Gaskey & Olds

(57) ABSTRACT

An auxiliary gear box for a transmission is provided including a piston housing having a first and second bore. First and second pistons are respectively arranged within the first and second bores and separate each of the first and second bores into two chambers. First and second shift shafts respectively extends from the first and second pistons and are each connected to shift forks. The exposed surface area of the piston in the chamber having the shift shaft is less than the exposed surface area of the piston on the chamber opposite the shift shaft. As a result, if both chambers of a bore are pressurized, the piston will move in the direction of the chamber having the shift shaft since a greater force will be generated on the piston in the chamber without the shift shaft. A three actuator arrangement is used to selectively actuate the pistons.

5 Claims, 3 Drawing Sheets

| GEAR | A | B | C | D |
|------|-----|-----|-----|-----|
| 1 | OFF | ON | OFF | ON |
| 2 | OFF | ON | ON | OFF |
| 3 | OFF | ON | ON | OFF |
| 4 | OFF | ON | ON | OFF |
| 5 | OFF | ON | ON | OFF |
| 6 | OFF | ON | ON | OFF |
| 7 | ON | OFF | ON | OFF |
| 8 | ON | OFF | ON | OFF |
| 9 | ON | OFF | ON | OFF |
| 10 | ON | OFF | ON | OFF |
| 11 | ON | OFF | ON | OFF |

| | GEAR | A | B | C | |
|---|---|---|---|---|---|
| Range - L, Splitter - L | 1 | OFF | ON | OFF | 1st Gear Set |
| | 2 | OFF | ON | ON | |
| Range - L, Splitter - R | 3 | OFF | ON | ON | |
| | 4 | OFF | ON | ON | 2nd Gear Set |
| | 5 | OFF | ON | ON | |
| | 6 | OFF | ON | ON | |
| Range - R, Splitter - R | 7 | ON | OFF | ON | |
| | 8 | ON | OFF | ON | |
| | 9 | ON | OFF | ON | 3rd Gear Set |
| | 10 | ON | OFF | ON | |
| | 11 | ON | OFF | ON | |

RANGE AND SPLITTER SYSTEM

BACKGROUND OF THE INVENTION

This invention relates to a commercial vehicle transmission having an auxiliary box, and more particularly, the invention relates to a configuration of actuators for manipulating the pistons used in shifting the gears of the auxiliary box.

Commercial vehicle transmissions typically include a manual or automated manual main gear box with an auxiliary box connected to the main gear box to provide additional gear ratios. For example, a commercial transmission providing eleven speeds may utilize an auxiliary gear box having three gear planes with two shift forks. Such an arrangement is shown in prior art FIG. 1A. The transmission 10 includes a piston housing 12 having a first 14 and second 16 bores with first 18 and second 20 shift shafts respectively arranged within the bores 14 and 16. Ends of the shift shafts 18 and 20 respectively support first 22 and second 24 pistons. The first 22 and second 24 pistons separate the first 14 and second 16 bores into first 26, second 28, third 30 and fourth 32 chambers. The chambers 26, 28, 30, and 32 are pressurized to move the pistons 22 and 24 from left to right to selectively engage gears within the auxiliary box of the transmission 10.

Pressurized air is selectively provided to the chamber 26, 28, 30 and 32 by four solenoids A, B, C and D. Only one of the chambers for each of the bores is pressurized at any one time to provide a desired gear set. The resultant gear sets for an eleven speed transmission is shown in FIG. 1B. A first gear set including first gear is achieved by pressurizing the second 28 and fourth 32 chambers by turning solenoids B and D on. A second gear set including gears 2 through 6 may be achieved by pressurizing the second 28 and third 30 chambers by turning solenoids B and C on. A third gear set including gears 7–11 may be selected by pressurizing the first 26 and third 30 chambers by turning solenoids A and C on.

The solenoids are rather expensive. Furthermore, the greater number of solenoids used with the transmission 10 the larger the piston housing 12 that is required thereby adding weight and increasing cost. Therefore, what is needed is an improved method and apparatus of achieving a desired gear set while reducing the overall weight and cost of the transmission.

SUMMARY OF THE INVENTION

The present invention provides an auxiliary gear box of a transmission including a piston housing having a first and a second bore. A first piston is arranged within the first bore and separates the first bore into first and second chambers. A first shift shaft extends from the first piston and is connected to a first shift bore for selectively engaging a first auxiliary gear in response to actuation of the first piston. A second piston is arranged within the second bore separating the second bore into third and fourth chambers. A second shift shaft extends from the second piston and is connected to a second shift fork for selectively engaging a second auxiliary gear in response to actuation of the second piston. In one example, this invention provides first, second and third actuators for selectively actuating the pistons. Unlike the prior art auxiliary gearbox shifting system, this invention only uses three actuators by fluidly connecting the first actuator to the first chamber. The second actuator is fluidly connected to the second and fourth chambers, and the third actuator is fluidly connected to the third chamber.

The exposed surface area of the piston in the chamber having the shift shaft is less than the exposed surface area of the piston on the chamber opposite the shift shaft. As a result, if both chambers of a bore are pressurized, the piston will move in the direction of the chamber having the shift shaft since a greater force will be generated on the piston in the chamber without the shift shaft. In one example, the second and fourth chambers include the portions of shift shafts. Designing the auxiliary box shifting arrangement with this relationship in mind enables one actuator from the typical four actuator system to be eliminated. Accordingly, the cost of the transmission would be reduced by eliminating a solenoid and reducing the size and machining of the piston housing.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figures 1A, 1B:
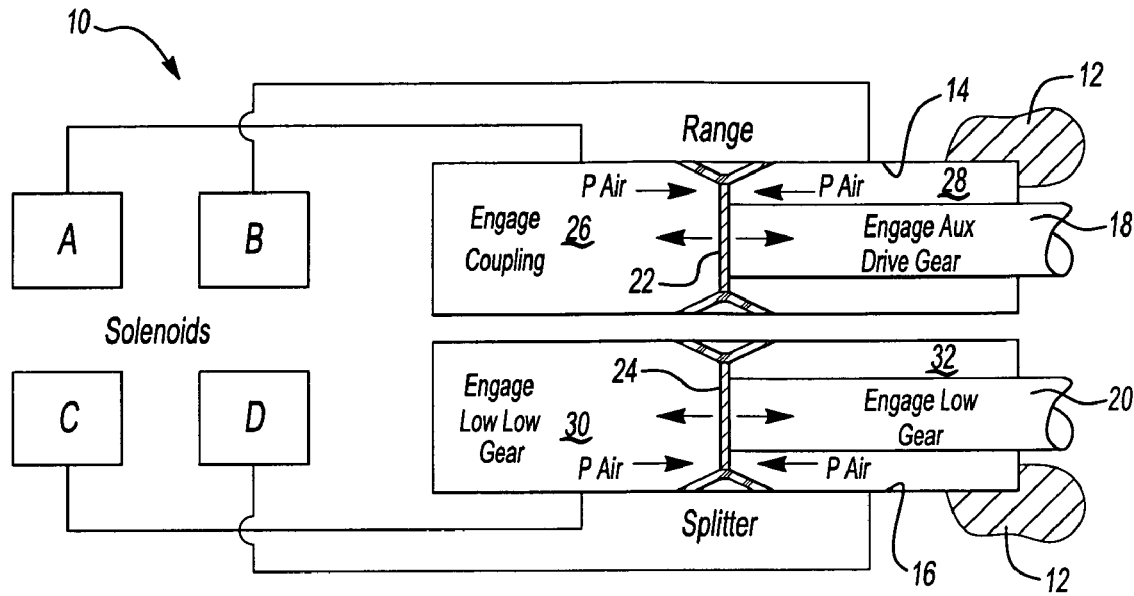
FIG. 1A is a schematic view of a prior art shifting configuration for an auxiliary box.
FIG. 1B is a table depicting the state of the actuators to effectuate various desired gear sets and gear ratios for the prior art system shown in FIG. 1A.
Figure 2:
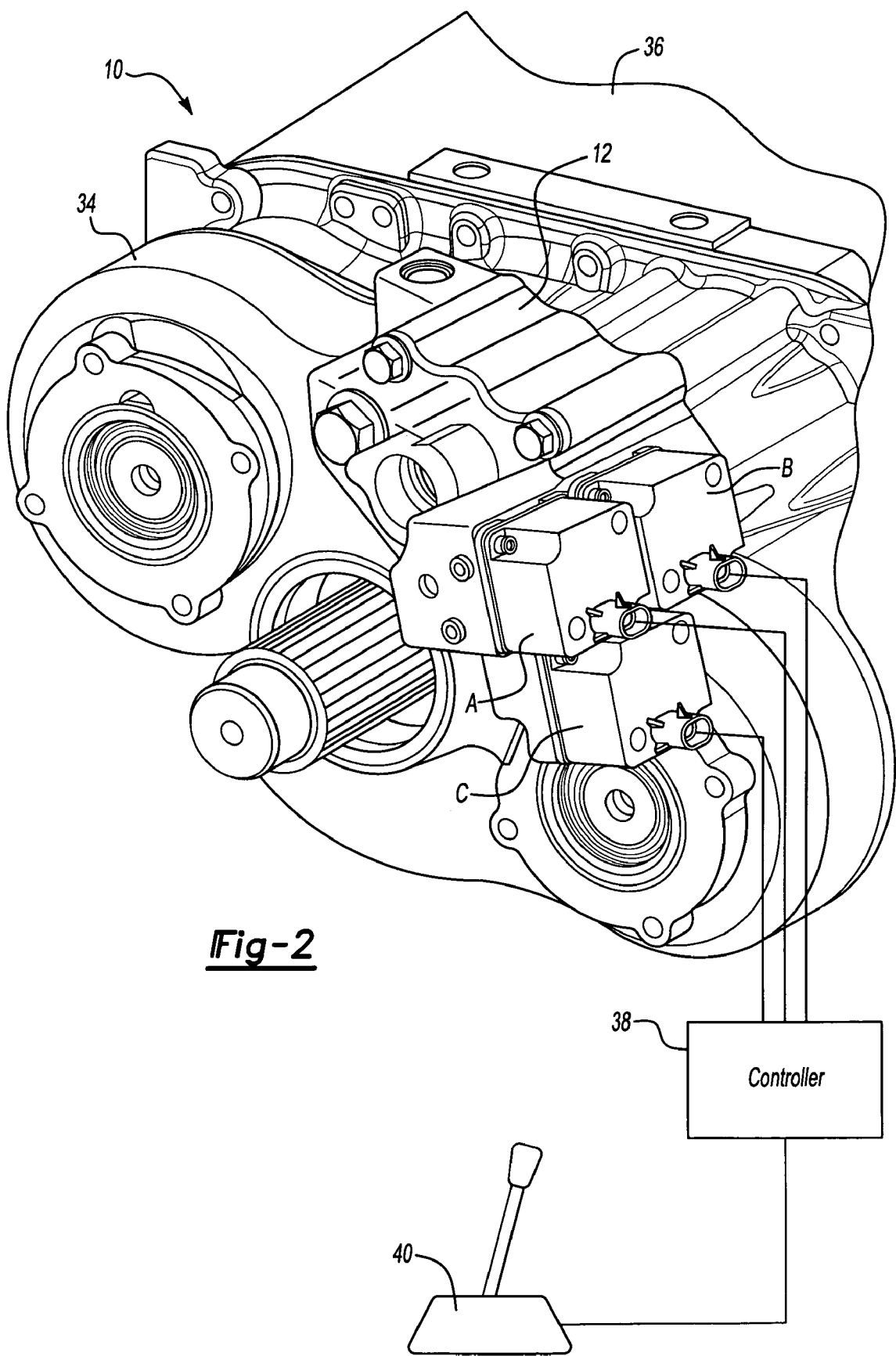
FIG. 2 is a perspective view of this invention.

An example of the inventive transmission 10 is shown in FIG. 2. The transmission 10 includes a main box 36 with an auxiliary box 34 secured to the main box to provide additional gear ratios to those provided by the main box. The auxiliary box includes a piston housing 12 secured to the auxiliary box 34 with three actuators supported on the housing 12. In the example shown, the actuators are solenoids A, B and C for a three gear plain auxiliary box having two shift forks. Unlike the prior art system shown in FIG. 1A, only three actuators are needed to obtain the desired gear sets for the desired number of gear ratios.

The solenoids A, B and C are connected to a controller 38 that receives a gear request signal from a gear selector 40. The controller 38 interprets the signal and commands the solenoids A, B and C to achieve the desired gear set for the requested gear ratio. Although the example transmission 10 includes three gear sets having eleven gear ratios, it is to be understood that this invention applies to any number of gear sets resulting in any number of gear ratios.

Figures 3A, 3B:
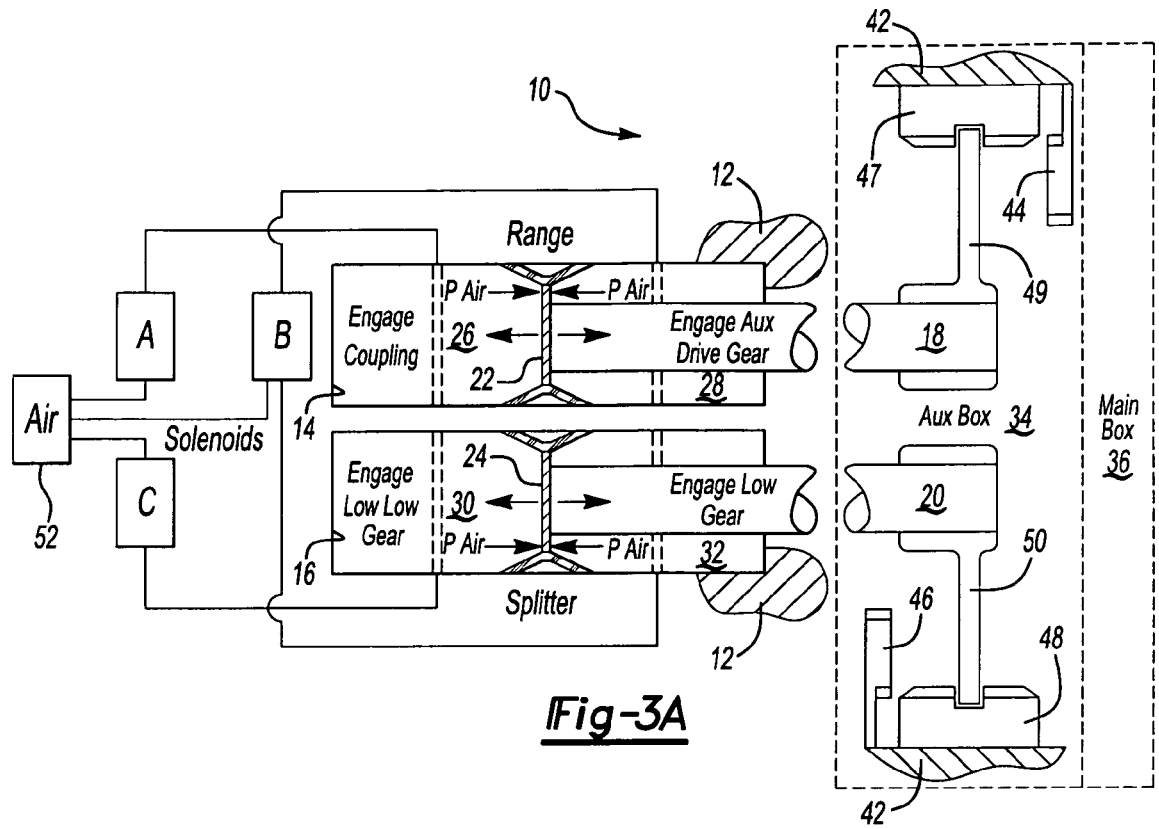
FIG. 3A is a schematic view of the shifting arrangement of this invention.
FIG. 3B is a table of the actuator states for the shifting configuration shown in FIG. 3A.

Referring to FIG. 3A, an example of this invention is schematically depicted. The transmission 10 includes an auxiliary box 34 connected to a main box 36, as well known in the art. The piston housing 12 includes first 14 and second 16 bores arranged therein. A first shift shaft 18 is arranged within the first bore 14, and a second shift shaft 20 is arranged within the second bore 16. Pistons 22 and 24 are slideably supported by the first 18 and second 20 shift shafts respectively within the first 14 and second 16 bores. The piston 22 may be referred to as a range piston and the piston 24 may be referred to as a slitter piston. The pistons 22 and 24 separate the first 14 and second 16 bores into first 26, second 28, third 30, and fourth 32 chambers. The pistons 22 and 24 move from the neutral positions as shown in FIG. 3A to the left and right positions depicted in phantom in response to actuation of the solenoids A, B and C and pressurization of the chambers 26, 28, 30 and 32.

The first 18 and second 20 shift shafts respectively support first 49 and second 50 shift forks for shifting clutch collars 47 and 48 that are supported on a gear shaft 42. The shifting arrangement shown is schematic. For example, the gear shaft 42 may support both of the clutch collars 47 and 48. Moreover, other gears may be supported on the gear shaft 42, which may cooperate with the clutch collars 47 and 48 to achieve the desired gear sets and gear ratios.

The solenoids A, B and C are connected to a pressurized fluid source 52 such as pressurized air for supplying the pressurized air to the chambers 26, 28, 30 and 32. For the configuration shown, the first shift shaft 18 extends from the range piston 22 into the second chamber 28. The second shift shaft 20 extends from the splitter piston 24 into the fourth chamber 32. The exposed surface area of the pistons 22 and 24 is greater in the first 26 and third 30 chambers than in the second 28 and fourth 32 chambers. For example, the ratio of exposed surface area of the pistons between the first 26 and third 30 chambers and the second 28 and fourth 32 chambers may be approximately 2:1. As a result, if both chambers of a bore are simultaneously pressurized, the piston will move in the direction of the chamber having the shift shaft since the force generated on the piston on the side opposite the shift shaft will be greater than the force generated on the piston on the side with the shift shaft. This relationship may be accounted for in the design process of the auxiliary box shifting configuration to eliminate one of the solenoids.

This invention fluidly connects one of the actuators to two chambers, which results in three chambers being pressurized for at least one of the desired gear sets in the example shown. Referring to FIG. 3B, the first gear set includes a first gear ratio. The first gear set is achieved by turning solenoid B on while solenoids A and C are off. Turning solenoid B on pressurizes the second 28 and fourth 32 chambers which moves the range piston 22 and splitter piston 24 to the left.

The second gear set, which includes gear ratios 2–6 is achieved by turning solenoids B and C on while solenoid A is off. The second 28, third 30 and fourth 32 chambers are pressurized, which moves the range piston 22 to the left and the splitter piston 24 to the right. Although both chambers of the second bore 16 are pressurized, the splitter piston 24 moves to the right since the force on the piston on the third chamber side is greater than the force on the piston on the fourth chamber side.

A third gear set including gear ratios 7–11 is obtained by turning solenoids A and C on and solenoid B off. The first 26 and third 30 chambers are pressurized moving the range piston 22 and splitter piston 24 to the right.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. An auxiliary gearbox of a transmission comprising:
a piston housing having a first bore and a second bore;
a first piston arranged within said first bore separating first and second chambers within said first bore, a first shaft extending from said first piston and connected to a first shift fork for selectively engaging a first auxiliary gear in response to actuation of said first piston;
a second piston arranged within said second bore separating third and fourth chambers within said second bore, a second shaft extending from said second piston and connected to a second shift fork for selectively engaging a second auxiliary gear in response to actuation of said second piston; and
first, second, and third actuators for selectively actuating said first and second pistons, said first actuator fluidly connected to said first chamber, said second actuator fluidly connected to said second and fourth chambers, and said third actuator fluidly connected to said third chamber, wherein a desired gear set is obtained by pressuring three of said first, second, third and fourth chambers, wherein said actuators are solenoids supported on said piston housing.

2. The auxiliary gearbox of claim 1, wherein said solenoids selectively provide pressurized fluid to said first, second and third chambers.

3. An auxiliary gearbox of a transmission comprising:
a piston housing having a first bore and a second bore;
a first piston arranged within said first bore separating first and second chambers within said first bore, a first shaft extending from said first piston and connected to a first shift fork for selectively engaging a first auxiliary gear in response to actuation of said first piston;
a second piston arranged within said second bore separating third and fourth chambers within said second bore, a second shaft extending from said second piston and connected to a second shift fork for selectively engaging a second auxiliary gear in response to actuation of said second piston; and
first, second, and third actuators for selectively actuating said first and second pistons, said first actuator fluidly connected to said first chamber, said second actuator fluidly connected to said second and fourth chambers, and said third actuator fluidly connected to said third chamber, and each of said first, second, and third actuators including on and off states, a first gear set defined by said first and third actuator in said off state and said second actuator in said on state, a second gear set defined by said first actuator in said off state and said second and third actuators in said on state, and a third gear set defined by said first and third actuators in said on state and said second actuator in said off state.

4. An auxiliary gearbox of a transmission comprising:
a piston housing having a first bore and a second bore;
a first piston arranged within said first bore separating first and second chambers within said first bore, a first shaft extending from said first piston and connected to a first shift fork for selectively engaging a first auxiliary gear in response to actuation of said first piston;
a second piston arranged within said second bore separating third and fourth chambers within said second bore, a second shaft extending from said second piston and connected to a second shift fork for selectively engaging a second auxiliary gear in response to actuation of said second piston;
first, second, and third actuators for selectively actuating said first and second pistons, said first actuator fluidly connected to said first chamber, said second actuator fluidly connected to said second and fourth chambers, and said third actuator fluidly connected to said third chamber, and each of said first, second, third and forth chambers include pressurized and unpressurized states, a first gear set defined by said second and fourth chambers in pressurized states and said first and third chamber in unpressurized states, a second gear set defined by said first chamber in said unpressurized state and said first, second, and fourth chambers in said pressurized states, and a third gear set defined by said first and third chambers in said pressurized states and said second and fourth chambers in said unpressurized states.

5. An auxiliary gearbox of a transmission comprising:

a piston housing having a first bore and a second bore;

a first piston arranged within said first bore separating first and second chambers within said first bore, a first shaft extending from said first piston and connected to a first shift fork for selectively engaging a first auxiliary gear in response to actuation of said first piston;

a second piston arranged within said second bore separating third and fourth chambers within said second bore, a second shaft extending from said second piston and connected to a second shift fork for selectively engaging a second auxiliary gear in response to actuation of said second piston; and first, second, and third actuators for selectively actuating said first and second pistons, said first actuator fluidly connected to said first chamber, said second actuator fluidly connected to said second and fourth chambers, and said third actuator fluidly connected to said third chamber, wherein a desired gear set is obtained by pressurizing three of said first, second, third, and fourth chambers.

* * * * *